(12) United States Patent
Dong et al.

(10) Patent No.: US 12,095,240 B2
(45) Date of Patent: Sep. 17, 2024

(54) PNEUMATIC STRIPPING TOOL

(71) Applicant: Shinda (Tangshan) Creative Oil & Gas Equipment Co., Ltd., Hebei (CN)

(72) Inventors: Jian Dong, Tangshan (CN); Jianliang Duan, Tangshan (CN)

(73) Assignee: SHINDA (TANGSHAN) CREATIVE OIL & GAS EQUIPMENT CO., LTD. (CN)

( * ) Notice: Subject to any disclaimer, the term of this patent is extended or adjusted under 35 U.S.C. 154(b) by 527 days.

(21) Appl. No.: 17/409,216

(22) Filed: Aug. 23, 2021

(65) Prior Publication Data

US 2022/0360058 A1 Nov. 10, 2022

Related U.S. Application Data

(63) Continuation of application No. PCT/CN2021/093534, filed on May 13, 2021.

(30) Foreign Application Priority Data

May 10, 2021 (CN) .......................... 202110505556.6

(51) Int. Cl.
*H02G 1/12* (2006.01)
*H01B 15/00* (2006.01)

(52) U.S. Cl.
CPC .......... *H02G 1/126* (2013.01); *H01B 15/006* (2013.01)

(58) Field of Classification Search
CPC .... Y10T 29/514; H02G 1/1251; H02G 1/126; H01B 15/006

USPC .......... 29/564.4; 30/90.1, 90.4; 81/9.4, 9.51
See application file for complete search history.

(56) References Cited

U.S. PATENT DOCUMENTS

| | | | | |
|---|---|---|---|---|
| 4,439,967 | A | * | 4/1984 | Dielenberg ............... E04B 2/26 52/439 |
| 5,542,327 | A | * | 8/1996 | Schultz ................ H01B 15/006 83/947 |
| 6,694,853 | B2 | * | 2/2004 | Adams ................ H01B 15/006 83/870 |
| 9,068,416 | B2 | * | 6/2015 | Knobloch, Jr. ....... E21B 27/005 |

(Continued)

FOREIGN PATENT DOCUMENTS

| CN | 212033653 | U | * | 11/2020 |
|---|---|---|---|---|
| CN | 112750580 | A | * | 5/2021 |
| CN | 113471888 | A | * | 10/2021 |

(Continued)

*Primary Examiner* — Sunil K Singh
*Assistant Examiner* — Michael Vitale
(74) *Attorney, Agent, or Firm* — Nields, Lemack & Frame, LLC

(57) ABSTRACT

A pneumatic stripping tool is provided. A top end of a main base is connected with an upper plate through screws; a middle part of a top end of the upper plate is connected with a handle through screws; one end of the upper plate is connected with a pneumatic-wrench fixing seat collar through screws; a pneumatic wrench is connected between the handle and the pneumatic-wrench fixing seat collar; the outer side of one end of the pneumatic wrench is connected with a power wrench sleeve; mounting holes are formed in portions of the main base which are corresponding to the power wrench sleeve; the inner side of one end of the power wrench sleeve is connected with a bottom wheel; and the bottom wheel extends into an inside of the mounting hole.

10 Claims, 11 Drawing Sheets

(56) References Cited

U.S. PATENT DOCUMENTS

2003/0150097 A1* 8/2003 Thoms ................. H02G 1/1292
29/564.4
2013/0104720 A1* 5/2013 Parker ................. H01B 15/006
83/886

FOREIGN PATENT DOCUMENTS

| CN | 114094508 A | * | 2/2022 |
| CN | 115360646 A | * | 11/2022 |

* cited by examiner

PNEUMATIC STRIPPING TOOL

CROSS REFERENCE TO RELATED APPLICATION(S)

This application is a continuation application of International Patent Application No. PCT/CN2021/093534, filed on May 13, 2021, which claims the benefit and priority of Chinese Patent Application No. 202110505556.6 filed on May, 10, 2021, entitled "PNEUMATIC STRIPPING TOOL", the entire contents of each of which are incorporated herein by reference.

TECHNICAL FIELD

The present disclosure relates to the field of cable stripping technologies, and specifically relates to a pneumatic stripping tool.

BACKGROUND ART

At present, with the development of the energy exploitation, the quantity of encapsulated pipe cables used in the oil and gas industry is increasing. When the worker connects the encapsulated pipe cables, the encapsulation material of the encapsulated pipe cables must be stripped to expose inner parts in the encapsulation material.

In the past, electric tools or electric knives were required for stripping the encapsulation material. However, due to the special nature of a petroleum and petrochemical operating environment and in consideration of the safety of the worker, these dangerous tools such as the tools or the electric knives cannot be used in this industry.

SUMMARY

The present disclosure provides a pneumatic stripping tool which can effectively solve the problems in the background. The problems are as follows. An existing stripping device for wire cables is unthorough in stripping, which is time-consuming and dangerous, and reduces the operating efficiency. Furthermore, wire cables are easy to deviate during stripping, so that inner cores of the wire cables are easy to damage.

In order to achieve the above-mentioned purpose, there provides a pneumatic stripping tool including a main base; where a top end of the main base is connected with an upper plate through first screws; a middle part of a top end of the upper plate is connected with a handle through second screws; one end of the upper plate is connected with a pneumatic-wrench fixing seat collar through third screws; a mobile cutting assembly is mounted inside the main base; the mobile cutting assembly comprises a pneumatic wrench, a power wrench sleeve, a mounting hole, a bottom wheel, two first grooved ball bearings, first snap rings, first mounting slots, two movable bearing seats, second grooved ball bearings, a cutter shaft, two blade spacer bushes, blades, a pipe limiting-block, a limiting shaft, second mounting slots, bearing pin bolts, third grooved ball bearings and bearing washers; the pneumatic wrench is connected between the handle and the pneumatic-wrench fixing seat collar; an inner side of one end of the pneumatic wrench is connected with the power wrench sleeve; the mounting hole is formed in a portion of the main base which is corresponding to the power wrench sleeve; an inner side of one end of the power wrench sleeve is connected with the bottom wheel; the bottom wheel extends into an inside of the mounting hole; portions, which are inside the mounting hole, of outer sides of two ends of the bottom wheel are each sleeved with a corresponding one of the two first grooved ball bearings; outer sides of the two first grooved ball bearings are each connected with a corresponding one of the first snap rings; the first mounting slots are formed in respective edge parts of the top end of the main base; two internal ends of the first mounting slots are each connected with a corresponding one of the two movable bearing seats; each of inner sides of the two movable bearing seats is sleeved with a corresponding one of the second grooved ball bearings; inner sides of the second grooved ball bearings are sleeved with the cutter shaft; portions, which are located between the two second grooved ball bearings, of outer sides of two ends of the cutter shaft are sleeved with the two blade spacer bushes; portions, which are located between the two blade spacer bushes, of an outer portion of the cutter shaft are sleeved with the blades; an edge part of one end of the main base is provided with the pipe limiting-block through fourth screws; an edge part of a top end of the pipe limiting-block is connected with the limiting shaft; the limiting shaft penetrates through the pipe limiting-block and extends out an outer side of the pipe limiting-block; the second mounting slots are formed in portions, which are above a joint between the main base and the pipe limiting-block, of two ends of the main base; each of two ends of the second mounting slots is connected with a corresponding one of the bearing pin bolts; the bearing pin bolts extend into an inside of the main base; portions, which are located inside the second mounting slots, of outer portions of the bearing pin bolts are each sleeved with a corresponding one of the third grooved ball bearings; and portions, which are located at bottom ends of the third grooved ball bearings, of the outer portions of the bearing pin bolts are each sleeved with a corresponding one of the bearing washers.

In embodiments, an outer portion of the pneumatic wrench is fitted to an inner wall of the power wrench sleeve; the inner wall of the power wrench sleeve is fitted to an outer side of the bottom wheel; inner walls of the two first grooved ball bearings are fitted to an outer portion of the bottom wheel; and outer portions of the two first grooved ball bearings are fitted to an inner wall of the mounting hole.

In embodiments, a plurality of bosses are uniformly arranged at a portion, which is located between the two first grooved ball bearings, of an outer portion of the bottom wheel; and fixing slots are formed in portions, which are corresponding to the first snap rings, of an inner wall of the mounting hole.

In embodiments, inner walls of the two movable bearing seats are fitted to respective outer portions of the second grooved ball bearings; inner walls of the second grooved ball bearings are fitted to the outer portion of the cutter shaft; the outer portion of the cutter shaft is fitted to inner walls of the two blade spacer bushes; and the outer portion of the cutter shaft is fitted to inner walls of the blades.

In embodiments, two ends of the cutter shaft are connected with respective second snap rings; the two movable bearing seats and the main base are connected via adjustment screws; the adjustment screws are threadedly connected with the main base; and the adjustment screws are each fixedly connected with a corresponding one of the two movable bearing seats through respective adjustment screw pins.

In embodiments, the top end of the pipe limiting-block is parallel to the top end of the main base; a size of an outer side of one end of the limiting shaft is greater than a size of an inner wall of the pipe limiting-block; and an outer side of an other end of the limiting shaft is connected with a third snap ring.

In embodiments, inner walls of the third grooved ball bearings are each fitted to a corresponding one of outer walls of the bearing pin bolts; and inner walls of the bearing washers are each fitted to a corresponding one of outer walls of the bearing pin bolts.

In embodiments, a portion of the main base which is adjacent one end of the pipe limiting-block is provided with a collection assembly; the collection assembly comprises a supporting seat, a moving block, a connection block, a rotating shaft, a motor, a limiting block, an electric telescopic rod, and a collection case; the portion of the main base which is adjacent the one end of the pipe limiting-block is welded with the supporting seat); an internal bottom end of the supporting seat) is connected with the moving block; an edge part of one end of the moving block which is adjacent the main base is fixedly provided with the connection block; an inner side of the connection block is connected with the rotating shaft; one end of the rotating shaft) which is adjacent the main base is connected with the motor; an other end of the rotating shaft is connected with the limiting block; an edge part of a top end of the moving block is connected with the electric telescopic rod; a top end of the electric telescopic rod is connected with the collection case; and the motor and an input end of the electric telescopic rod are electrically connected with an output end of an external power supply.

In embodiments, slide grooves are formed in portions, which are corresponding to the moving block, of an inner wall of the supporting seat; balls are uniformly embedded at portions, which are located inside the slide grooves, of edge parts of the moving block; an outer portion of the collection case is fitted to the inner wall of the supporting seat; and a bottom end of an inner portion of the collection case is flush with a middle part of the top end of the pipe limiting-block.

In embodiments, an internal thread is formed on an inner portion of the connection block; an external thread is formed on an outer portion of the rotating shaft; the connection block is threadedly connected with the rotating shaft; and the motor is fixedly connected with the supporting seat.

Compared with the existing technology, the embodiments have the beneficial effects that the structure is scientific and reasonable, and is safe and convenient to use.

1. The mobile cutting assembly is provided. A to-be-stripped wire cable is placed between the third grooved ball bearings, The bottom wheel is connected with the pneumatic wrench by means of the power wrench sleeve. The pneumatic wrench drives the bottom wheel to rotate. The bottom wheel is in contact with the to-be-stripped wire cable. The plurality of bosses are uniformly arranged at the portions, which are located between the two first grooved ball bearings, of the outer portion of the bottom wheel, so as to increase a friction force between the bottom wheel and the to-be-stripped wire cable. The bottom wheel drives the to-be-stripped wire cable to move. The blades are arranged on the cutter shaft. The to-be-stripped wire cable moves to contact the blades, and the blades start to cut a wire cable skin between two adjacent metal inner cores of the wire cable. After the cutting is completed, the inner core of the wire cable can be stripped via a cut crack, thereby facilitating the stripping of the inner core of the wire cable. Due to the arrangement of the third grooved ball bearings, the position of the wire cable can be determined relatively and accurately. By means of the pipe limiting-block and the limiting shaft, it can be ensured that the cut wire cable does not deviate, and the probability of damage to the inner core of the wire cable is decreased.

2. By means of the third grooved ball bearings disposed at the two ends of the main base, when cutting the wire cable, the wire cable does not deviate during the movement of the wire cable, thereby avoiding the damage to the inner core of the wire cable. The adjustment screws are threadedly connected with the main base, and the adjustment screws and the movable bearing seats are fixedly connected by means of the adjustment screw pins. In this way, when cutting, according to an actual need, the adjustment screw pins are removed, the adjustment screws are rotated to adjust the distance between the adjustment screws and the main base, and the adjustment screw pins are re-installed to fixedly connect the movable bearing seats to the adjustment screws, thereby adjusting the distance between the blades and the wire cable to change a cutting depth of the blades to the wire cable skin. As such, the cutting depth of the blades can be adjusted by adjusting the adjustment screws, which is convenient and quick.

3. The collection assembly is provided. The bottom end of the inner portion of the collection case is flush with the middle part of the top end of the pipe limiting-block, so that the cut wire cable moves to the inner portion of the collection case by means of the pipe limiting-block. The collection case is lowered through the electric telescopic rod till the top end of the cut wire cable is flush with the middle part of the top end of the pipe limiting-block, and then the collection case continues to collect a next segment of cut wire cable. When the wire cables in the collection case are higher than the middle part of the top end of the pipe limiting-block, the cutting is stopped, and the motor is clockwise turned on and drives the rotating shaft to rotate. Since the rotating shaft is threadedly connected with the connection block, the connection block starts to move to drive the collection case to move to a worker. The worker unloads the wire cables and anticlockwise turns on the motor, so as to enable the collection case to return to the original position to facilitate the collection of the wire cable.

BRIEF DESCRIPTION OF THE DRAWINGS

The accompanying drawings are used to provide a further understanding of the present disclosure and constitute a part of this specification to explain the present disclosure together with the embodiments of the present disclosure, and do not constitute restrictions to the present disclosure.

In the drawings.

Reference signs in drawings: 1: main base; 2: upper plate; 3: handle; 4: pneumatic-wrench fixing seat collar; 5: mobile cutting assembly; 501: pneumatic wrench; 502: power wrench sleeve; 503: mounting hole; 504: bottom wheel; 505: first grooved ball bearing; 506: first snap ring; 507: first mounting slot; 508: movable bearing seat; 509: second grooved ball bearing; 510: cutter shaft; 511: blade spacer bush; 512: blade; 513: pipe limiting-block; 514: limiting shaft; 515: second mounting slot; 516: bearing pin bolt; 517: third grooved ball bearing; 518: bearing washer; 6: second snap ring; 7: adjustment screw; 8: adjustment screw pin; 9: collection assembly; 901: supporting seat; 902: moving block; 903: connection block; 904: rotating shaft; 905: motor; 906: limiting block; 907: electric telescopic rod; 908: collection case; 10: third snap ring.

DETAILED DESCRIPTION OF THE EMBODIMENTS

The preferred embodiments of the present disclosure are described below with reference to the accompanying drawings, and it should be understood that the preferred embodiments described herein are merely illustrative and explanatory of the present disclosure and are not restrictive of the present disclosure.

Figure 1:
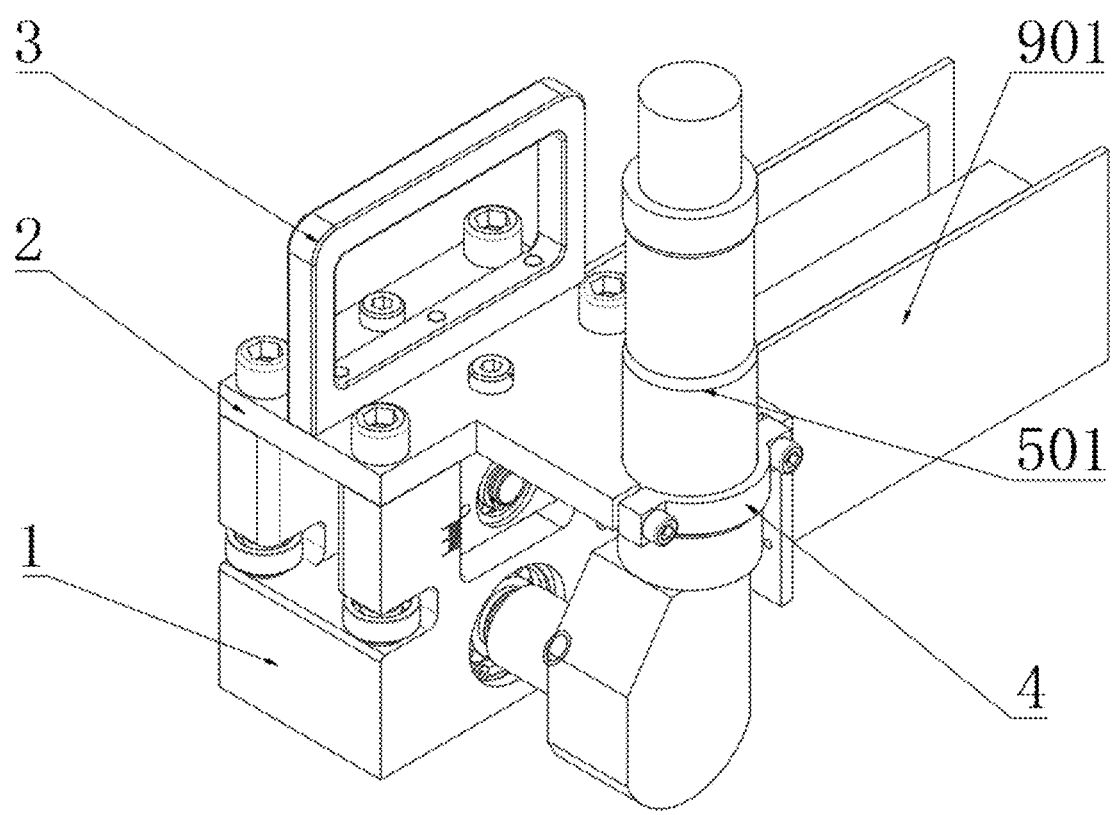
FIG. 1 is a schematic structural diagram according to an embodiment of the present disclosure.
Figure 2:
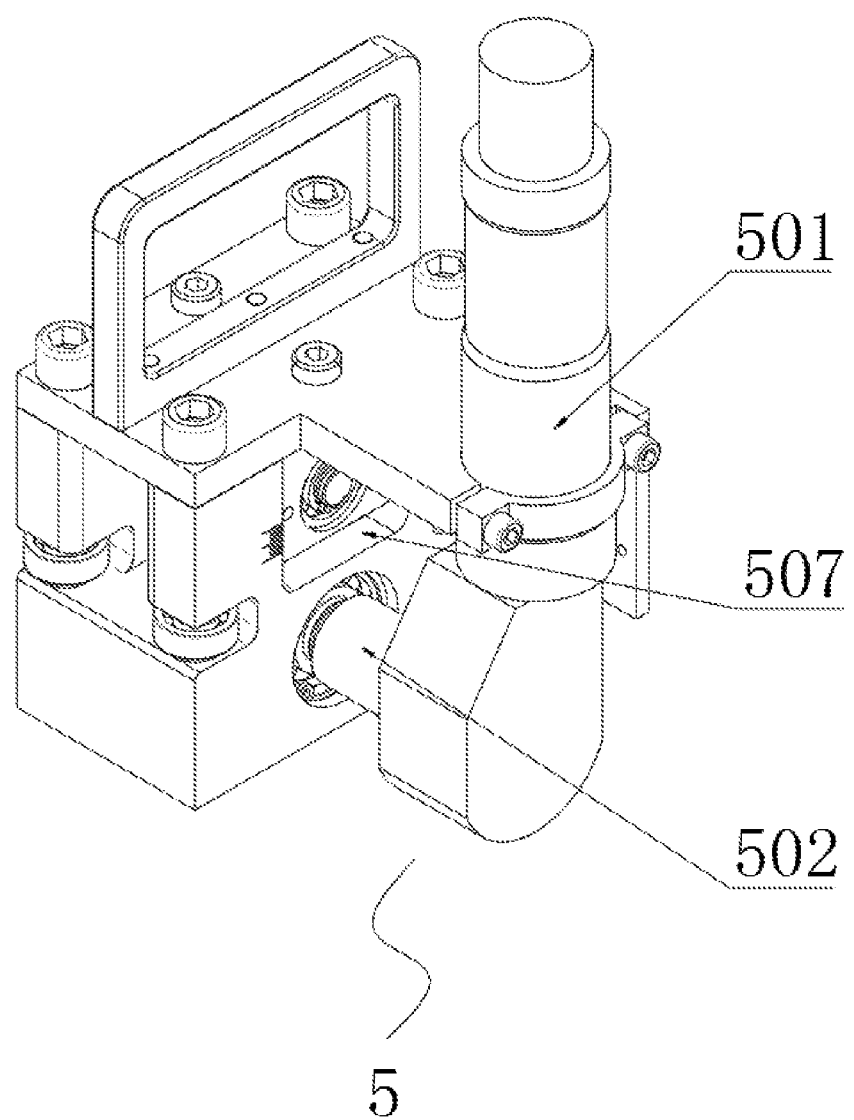
FIG. 2 is a schematic structural diagram of a mobile cutting assembly according to an embodiment of the present disclosure.
Figure 3:
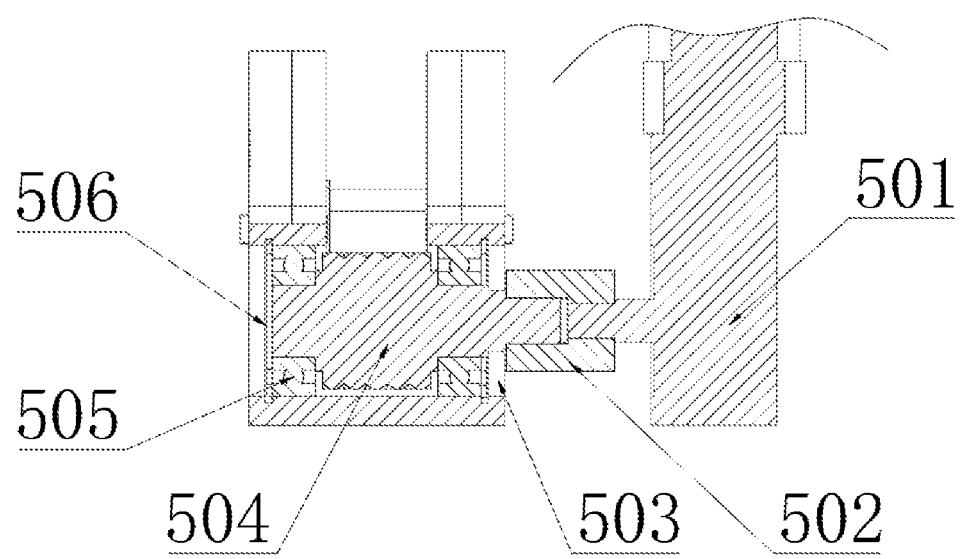
FIG. 3 is a schematic structural diagram of installation of a bottom wheel according to an embodiment of the present disclosure.
Figure 4:
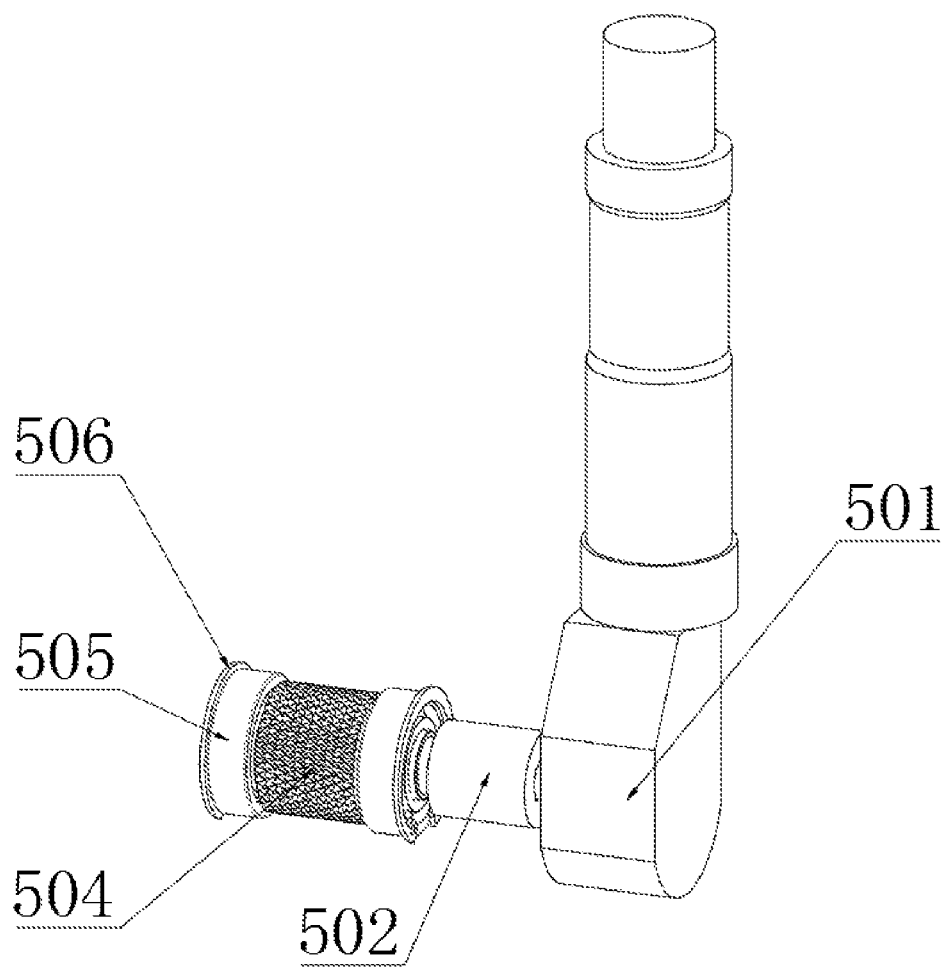
FIG. 4 is a schematic structural diagram of installation of first snap rings according to an embodiment of the present disclosure.
Figure 5:
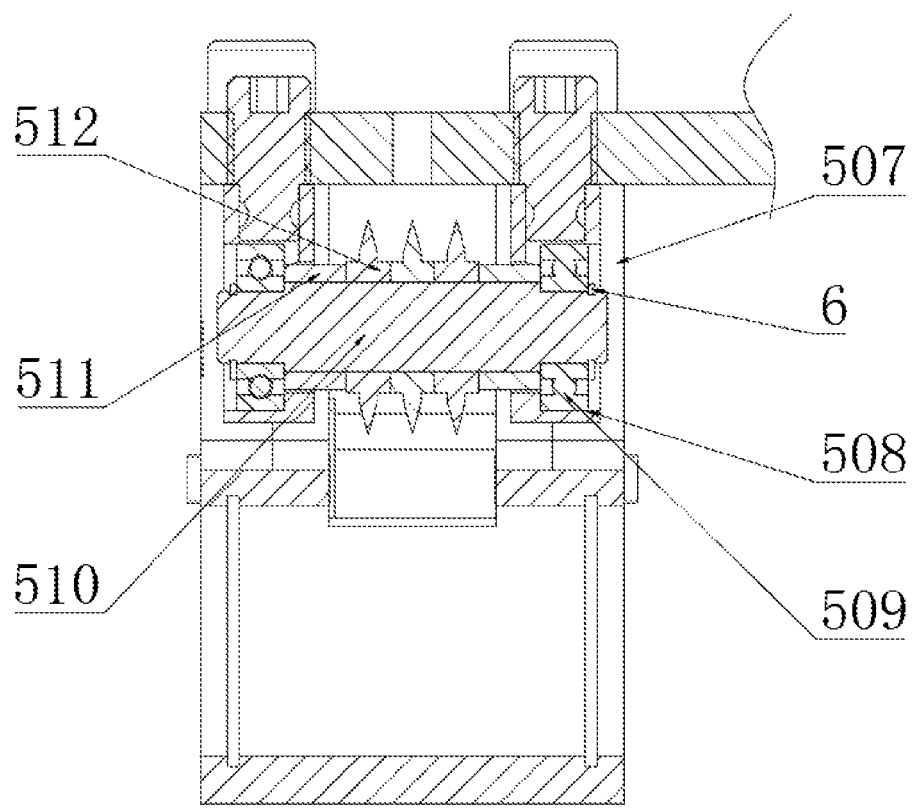
FIG. 5 is a schematic structural diagram of installation of a cutter shaft according to an embodiment of the present disclosure.
Figure 6:
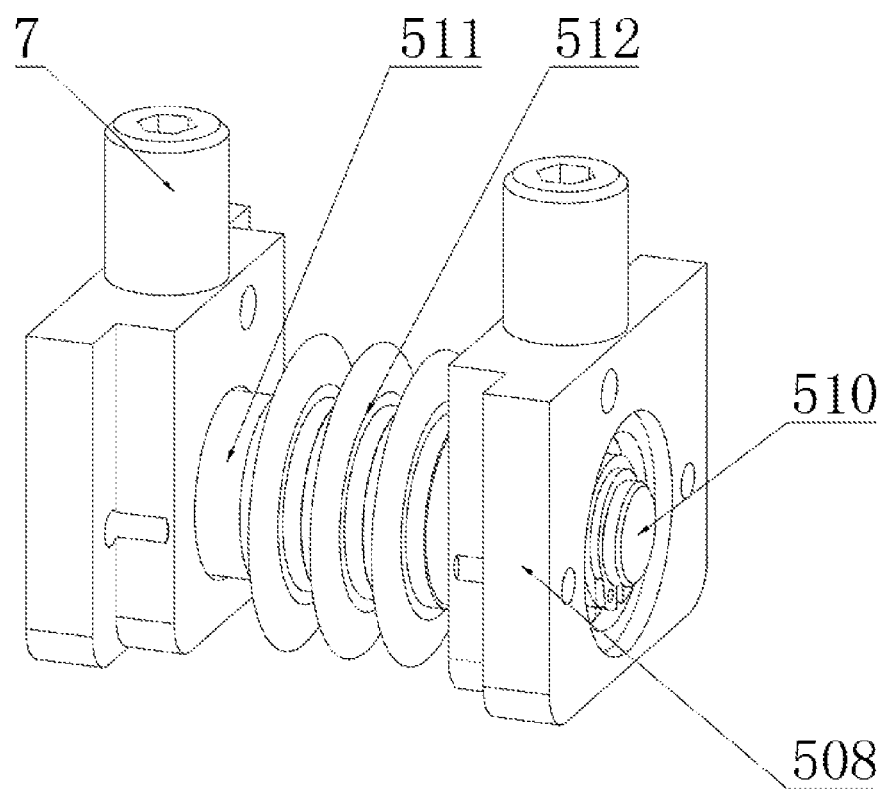
FIG. 6 is a schematic structural diagram of installation of blades according to an embodiment of the present disclosure.
Figure 7:
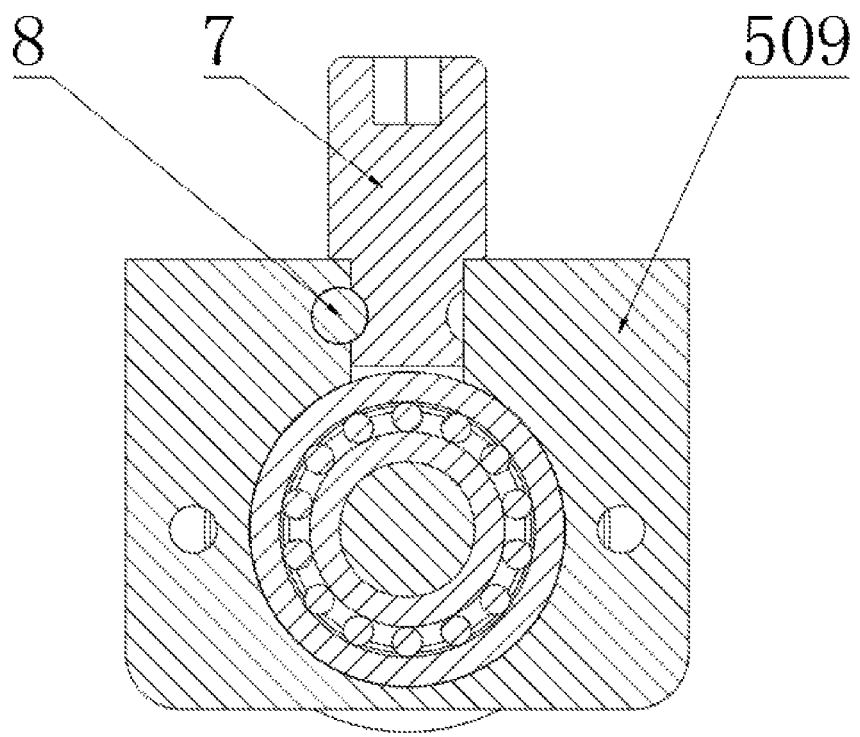
FIG. 7 is a schematic structural diagram of installation of adjustment screws according to an embodiment of the present disclosure.
Figure 8:
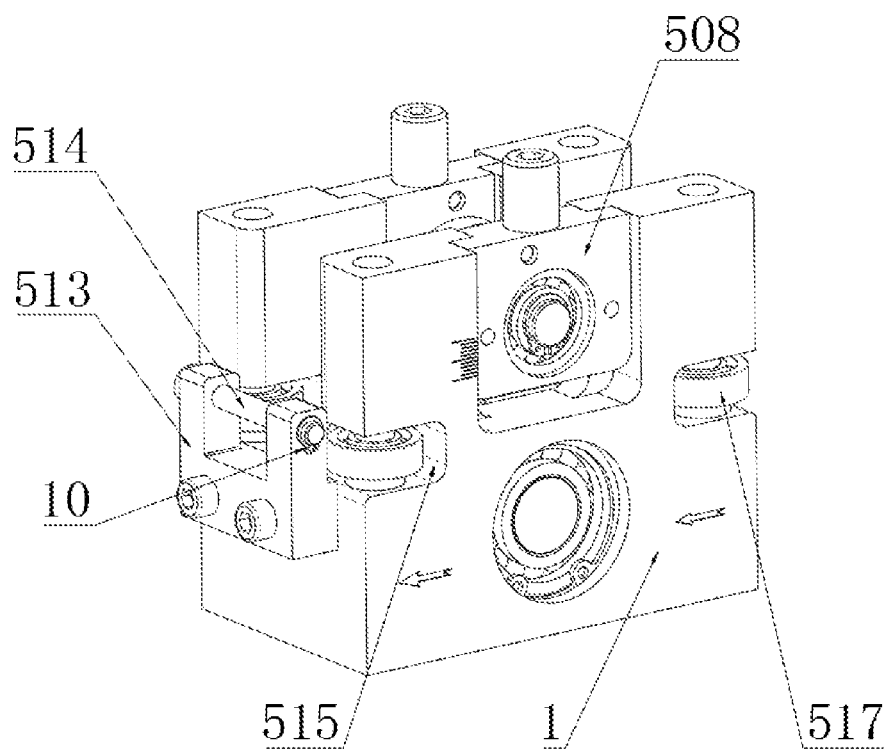
FIG. 8 is a schematic structural diagram of installation of a limiting shaft according to an embodiment of the present disclosure.
Figure 9:
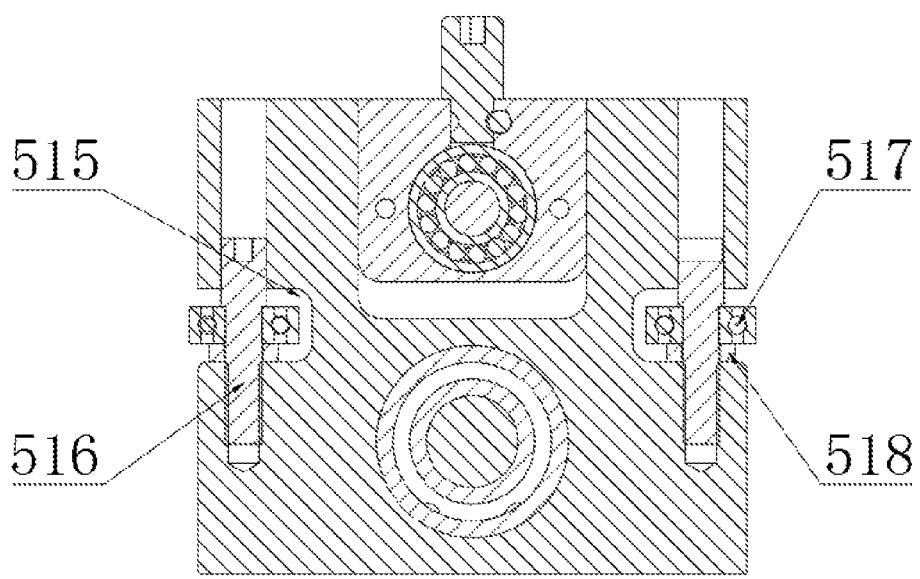
FIG. 9 is a schematic structural diagram of installation of bearing washers according to an embodiment of the present disclosure.
Figure 10:
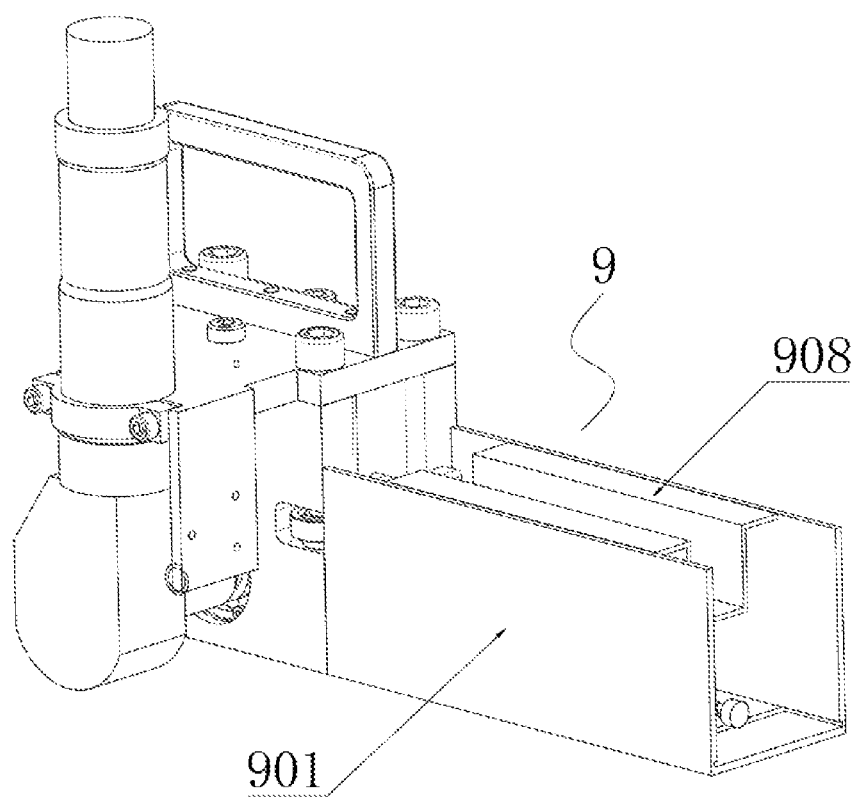
FIG. 10 is a schematic structural diagram of a collection assembly according to an embodiment of the present disclosure.
Figure 11:
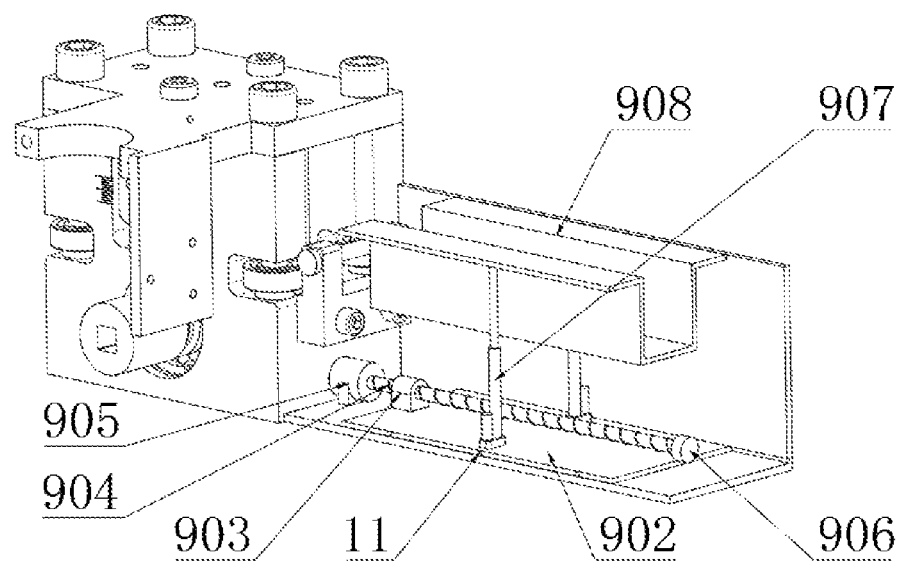
FIG. 11 is a schematic structural diagram of installation of a moving block according to an embodiment of the present disclosure.

In embodiments, as shown in FIG. 1 to FIG. 11, the present disclosure provides the following technical solution. A pneumatic stripping tool includes a main base 1. A top end of the main base 1 is connected with an upper plate 2 through screws. A middle part of the top end of the upper plate 2 is connected with a handle 3 through screws. One end of the upper plate 2 is connected with a pneumatic-wrench fixing seat collar 4 through screws. A mobile cutting assembly 5 is mounted inside the main base 1. The mobile cutting assembly 5 includes a pneumatic wrench 501, a power wrench sleeve 502, a mounting hole 503, a bottom wheel 504, first grooved ball bearings 505, first snap rings 506, first mounting slots 507, movable bearing seats 508, second grooved ball bearings 509, a cutter shaft 510, blade spacer bushes 511, blades 512, a pipe limiting-block 513, a limiting shaft 514, second mounting slots 515, bearing pin bolts 516, third grooved ball bearings 517 and bearing washers 518.

The pneumatic wrench 501 is connected between the handle 3 and the pneumatic-wrench fixing seat collar 4. The outer side of one end of the pneumatic wrench 501 is connected with the power wrench sleeve 502. The outer portion of the pneumatic wrench 501 is fitted to the inner wall of the power wrench sleeve 502. The mounting hole 503 is formed in a portion of the main base 1 which is corresponding to the power wrench sleeve 502. The inner side of one end of the power wrench sleeve 502 is connected with the bottom wheel 504. The inner wall of the power wrench sleeve 502 is fitted to the outer side of the bottom wheel 504. The bottom wheel 504 extends into an inside of the mounting hole 503. Portions, which are located inside the mounting hole 503, of the outer sides of two ends of the bottom wheel 504 are sleeved with the first grooved ball bearings 505. A plurality of bosses are uniformly arranged at a portion, which is located between the two first grooved ball bearings 505, of an outer portion of the bottom wheel 504, so as to increase a friction force between the bottom wheel 504 and a wire cable. The inner walls of the first grooved ball bearings 505 are fitted to the outer portion of the bottom wheel 504. The outer portions of the first grooved ball bearings 505 are fitted to the inner wall of the mounting hole 503. The outer sides of the two first grooved ball bearings 505 are each connected with a corresponding one of the first snap rings 506. Fixing slots are formed in portions, which are corresponding to the first snap rings 506, of the inner wall of the mounting holes 503, so as to facilitate fixing of the first snap rings 506 and to prevent the bottom wheel 504 from deviating.

First mounting slots 507 are formed in respective edge parts of the top end of the main base 1. Two internal ends of the first mounting slots 507 are each connected with a corresponding one of the movable bearing seats 508. The movable bearing seats 508 and the main base 1 are connected via adjustment screws 7. The adjustment screws 7 are threadedly connected with the main base 1. The adjustment screws 7 are each fixedly connected with a corresponding one of the movable bearing seats 508 through respective adjustment screw pins 8. In this way, it is convenient for the fixed connection between the movable bearing seats 508 and the main base 1, and convenient for adjusting the positions of the movable bearing seats 508. The inner sides of the two movable bearing seats 508 are each sleeved with a corresponding one the second grooved ball bearings 509. The inner walls of the movable bearing seats 508 are each fitted to a corresponding one of the outer portions of the second grooved ball bearings 509. The inner sides of the second grooved ball bearings 509 are sleeved with the cutter shaft 510. The outer sides of two ends of the cutter shaft 510 are connected with second snap rings 6, so as to prevent the second grooved ball bearings 509 from deviating. The inner walls of the second grooved ball bearings 509 are fitted to the outer portion of the cutter shaft 510. Portions, which are located between the two second grooved ball bearings 509, of the outer sides of two ends of the cutter shaft 510 are sleeved with the blade spacer bushes 511. The outer portion of the cutter shaft 510 is fitted to the inner walls of the blade spacer bushes 511. Positions, which are located between the two blade spacer bushes 511, of the outer portion of the cutter shaft 510 are sleeved with the blades 512. The outer portion of the cutter shaft 510 is fitted to the inner walls of the blades 512.

An edge part of one end of the main base 1 is provided with the pipe limiting-block 513 through screws. A top end of the pipe limiting-block 513 is parallel to the top end of the main base 1 to prevent a stripped wire cable from deviating. An edge part of a top end of the pipe limiting-block 513 is connected with the limiting shaft 514. The limiting shaft 514 penetrates through the pipe limiting-block 513 and extends out the outer side of the pipe limiting-block 513. A size of an outer side of one end of the limiting shaft 514 is greater than a size of the inner wall of the pipe limiting-block 513. An outer side of an other end of the limiting shaft 514 is connected with a third snap ring 10 to facilitate fixed connection between the limiting shaft 514 and the pipe limiting-block 513. The second mounting slots 515 are formed in portions, which are above a joint between the main base 1 and the pipe limiting-block 513, of two ends of the main base 1. Two ends of the second mounting slots 515 are each connected with a corresponding one of the bearing pin bolts 516. The bearing pin bolts 516 extend into an inside of the main base 1. Portions, which are located inside the second mounting slots 515, of the outer portions of the bearing pin bolts 516 are each sleeved with a corresponding one of the third grooved ball bearings 517. The inner walls of the third grooved ball bearings 517 are each fitted to a corresponding one of outer walls of the bearing pin bolts 516. Positions, which are located at bottom ends of the third grooved ball bearings 517, of the outer portions of the bearing pin bolts 516 are each sleeved with a corresponding one of the bearing washers 518. The inner walls of the bearing washers 518 are each fitted to a corresponding one of outer walls of the bearing pin bolts 516.

A portion of the main base 1 which is adjacent one end of the pipe limiting-block 513 is provided with a collection assembly 9. The collection assembly 9 includes a supporting seat 901, a moving block 902, a connection block 903, a rotating shaft 904, a motor 905, a limiting block 906, an electric telescopic rod 907, and a collection case 908.

The portion of the main base 1 which is adjacent the one end of the pipe limiting-block 513 is welded with the supporting seat 901. An internal bottom end of the supporting seat 901 is connected with the moving block 902. Slide grooves are formed in portions, which are corresponding to the moving block 902, of an inner wall of the supporting seat 901. Balls 11 are uniformly embedded at portions, which are located inside the slide grooves, of edge parts of the moving block 902, so as to facilitate the movement of the moving block 902. An edge part of one end of the moving block 902 which is adjacent the main base 1 is fixedly provided with the connection block 903. An inner side of the connection block 903 is connected with the rotating shaft 904. An internal thread is formed on an inner portion of the connection block 903. An external thread is formed on an outer portion of the rotating shaft 904. The connection block 903 is threadedly connected with the rotating shaft 904 to facilitate the movement of the connection block 903. One end of the rotating shaft 904 which is adjacent the main base 1 is connected with the motor 905. The motor 905 is fixedly connected with the supporting seat 901. The other end of the rotating shaft 904 is connected with the limiting block 906. An edge part of a top end of the moving block 902 is connected with the electric telescopic rod 907. A top end of the electric telescopic rod 907 is connected with the collection case 908. An outer portion of the collection case 908 is fitted to the inner wall of the supporting seat 901. A bottom end of an inner portion of the collection case 908 is flush with a middle part of the top end of the pipe limiting-block 513, so as to prevent the wire cable from deviating during the collection of the wire cable. The motor 905 and an input end of the electric telescopic rod 907 are electrically connected with an output end of an external power supply.

A working principle and a use flow of the present disclosure are as follows. Firstly, a to-be-stripped wire cable is placed between the third grooved ball bearings 517 at one end that is away from the supporting seat 901, and pushed to a position above the bottom wheel 504. The pneumatic wrench 501 provides power to drive the power wrench sleeve 502 to rotate. The power wrench sleeve 502 rotates to drive the bottom wheel 504 to rotate. The bottom wheel 504 is in contact with the to-be-stripped wire cable. The plurality of bosses are uniformly arranged at the portion, which is located between the two first grooved ball bearings 505, of the outer portion of the bottom wheel 504, so as to increase the friction force between the bottom wheel 504 and the to-be-stripped wire cable. The bottom wheel 504 drives the to-be-stripped wire cable to move. The cutter shaft 510 is mounted in the first mounting slots 507 formed above the bottom wheel 504. The outer portion of the cutter shaft 510 is sleeved with the blades 512. The to-be-stripped wire cable moves forward to start to contact the blades 512. The blades 512 starts to cut a wire cable skin between two adjacent metal inner cores of the wire cable. The third grooved ball bearings 517 are symmetrically disposed, so that the position of the wire cable can be determined relatively and accurately, so as to enable the wire cable to move forward straightly.

Secondly, when the cut wire cable moves forward to pass through the pipe limiting-block 513 and the limiting shaft 514, since the pipe limiting-block 513 and the limiting shaft 514 limit the wire cable, it is ensured that the cut wire cable does not deviate. Since the bottom end of the inner portion of the collection case 908 is flush with the middle part of the top end of the pipe limiting-block 513, the cut wire cable moves to the inner portion of the collection case 908 by means of the pipe limiting-block 513, so as to ensure that the cut wire cable that is collected does not deviate. After the cutting for the wire cable is completed, another segment of uncut wire cable is started to be placed. When the second segment of wire cable moves to a position between the pipe limiting-block 513 and the limiting shaft 514, at this time, the first segment of wire cable completely moves to the inner portion of the collection case 908, the cutting of the wire cable is stopped, and the electric telescopic rod 907 is turned on. The electric telescopic rod 907 is a model ANT-26. When the collection case 908 is lowered till the top end of the cut wire cable is flush with the middle part of the top end of the pipe limiting-block 513, the electric telescopic rod 907 is turned off, so as to re-start to cut the wire cable and collect the next segment of cut wire cable. When the wire cables in the collection case 908 are higher than the middle part of the top end of the pipe limiting-block 513, the cutting of the wire cable is stopped, and the motor 905 is clockwise turned on. The motor 905 is a model Y2-160M1-8. The motor 905 drives the rotating shaft 904 to rotate. Since the rotating shaft 904 is threadedly connected with the connection block 903, the connection block 903 starts to move to drive the collection case 908 to move to a worker. Then, the worker unloads the wire cable and anticlockwise turns on the motor 905, so as to enable the collection case 908 to return to the original position to collect wire cables again.

Finally, when the cutting depth of the blade 512 needs to be adjusted, since the adjustment screws 7 are threadedly connected with the main case 1, and the adjustment screws 7 are fixedly connected with the movable bearing seats 508 through the adjustment screw pins 8, the adjustment screws 7 are rotated after the adjustment screw pins 8 are removed, so as to adjust the distance between the adjustment screws 7 and the main base 1. Then, the adjustment screw pins 8 are re-installed to fixedly connect the movable bearing seats 508 to the adjustment screws 7. In this way, the distance between the blades 512 and the wire cable is adjusted, so as to change the cutting depth of the blades 512 to the wire cable skin. As such, the cutting depth of the blades 512 can be adjusted by adjusting the adjustment screws 7, which is convenient and quick.

Accordingly, it should be noted that, the above descriptions are only preferred examples of the present disclosure and are not intended to limit the present disclosure. Although the present disclosure has been described in detail with reference to the foregoing embodiments, those skilled in the art can still modify the technical solutions in the foregoing various embodiments, or equivalently replace partial technical features. It is intended that the present disclosure covers the modifications and variations of the present disclosure provided they come within the spirit and scope of the present disclosure.

What is claimed is:

1. A pneumatic stripping tool, comprising: a main base, wherein a top end of the main base is connected with an upper plate through first screws; a middle part of a top end of the upper plate is connected with a handle through second screws; one end of the upper plate is connected with a pneumatic-wrench fixing seat collar through third screws; a mobile cutting assembly is mounted inside the main base; the mobile cutting assembly comprises a pneumatic wrench, a power wrench sleeve, a mounting hole, a bottom wheel, two first grooved ball bearings, first snap rings, first mounting slots, two movable bearing seats, second grooved ball bearings, a cutter shaft, two blade spacer bushes, blades, a pipe limiting-block, a limiting shaft, second mounting slots, bearing pin bolts, third grooved ball bearings and bearing washers;

the pneumatic wrench is connected between the handle and the pneumatic-wrench fixing seat collar; an inner side of one end of the pneumatic wrench is connected with the power wrench sleeve; the mounting hole is formed in a portion of the main base which is corresponding to the power wrench sleeve; an inner side of one end of the power wrench sleeve is connected with the bottom wheel; the bottom wheel extends into an inside of the mounting hole; portions, which are inside the mounting hole, of outer sides of two ends of the bottom wheel are each sleeved with a corresponding one of the two first grooved ball bearings; outer sides of the two first grooved ball bearings are each connected with a corresponding one of the first snap rings;

the first mounting slots are formed in respective edge parts of the top end of the main base; two internal ends of the first mounting slots are each connected with a corresponding one of the two movable bearing seats; each of the two movable bearing seats has a respective inner side that is sleeved with a corresponding one of the second grooved ball bearings; inner sides of the second grooved ball bearings are sleeved with the cutter shaft; portions, which are located between the two second grooved ball bearings, of outer sides of two ends of the cutter shaft are sleeved with the two blade spacer bushes; portions, which are located between the two blade spacer bushes, of an outer portion of the cutter shaft are sleeved with the blades;

an edge part of one end of the main base is provided with the pipe limiting-block through fourth screws; an edge part of a top end of the pipe limiting-block is connected with the limiting shaft; the limiting shaft penetrates through the pipe limiting-block and extends out an outer side of the pipe limiting-block; the second mounting slots are formed in portions, which are above a joint between the main base and the pipe limiting-block, of two ends of the main base; each of the second mounting slots has two ends, and each of the two ends of the second mounting slot is connected with a corresponding one of the bearing pin bolts; the bearing pin bolts extend into an inside of the main base; portions, which are located inside the second mounting slots, of outer portions of the bearing pin bolts are each sleeved with a corresponding one of the third grooved ball bearings; and portions, which are located at bottom ends of the third grooved ball bearings, of the outer portions of the bearing pin bolts are each sleeved with a corresponding one of the bearing washers.

2. The pneumatic stripping tool according to claim 1, wherein an outer portion of the pneumatic wrench is fitted to an inner wall of the power wrench sleeve; the inner wall of the power wrench sleeve is fitted to an outer side of the bottom wheel; inner walls of the two first grooved ball bearings are fitted to an outer portion of the bottom wheel; and outer portions of the two first grooved ball bearings are fitted to an inner wall of the mounting hole.

3. The pneumatic stripping tool according to claim 1, wherein a plurality of bosses are uniformly arranged at a portion, which is located between the two first grooved ball bearings, of an outer portion of the bottom wheel; and fixing slots are formed in portions, which are corresponding to the first snap rings, of an inner wall of the mounting hole.

4. The pneumatic stripping tool according to claim 1, wherein inner walls of the two movable bearing seats are fitted to respective outer portions of the second grooved ball bearings; inner walls of the second grooved ball bearings are fitted to the outer portion of the cutter shaft; the outer portion of the cutter shaft is fitted to inner walls of the two blade spacer bushes; and the outer portion of the cutter shaft is fitted to inner walls of the blades.

5. The pneumatic stripping tool according to claim 1, wherein two ends of the cutter shaft are connected with respective second snap rings; the two movable bearing seats and the main base are connected via adjustment screws; the adjustment screws are threadedly connected with the main base; and the adjustment screws are each fixedly connected with a corresponding one of the two movable bearing seats through respective adjustment screw pins.

6. The pneumatic stripping tool according to claim 1, wherein the top end of the pipe limiting-block is parallel to the top end of the main base; a size of an outer side of one end of the limiting shaft is greater than a size of an inner wall of the pipe limiting-block; and an outer side of an other end of the limiting shaft is connected with a third snap ring.

7. The pneumatic stripping tool according to claim 1, wherein an inner wall of each third grooved ball bearing is fitted to an outer wall of a corresponding one of the bearing pin bolts; and an inner wall of each bearing washers is fitted to the outer wall of a corresponding one of the bearing pin bolts.

8. The pneumatic stripping tool according to claim 1, wherein a portion of the main base which is adjacent one end of the pipe limiting-block is provided with a collection assembly; the collection assembly comprises a supporting seat, a moving block, a connection block, a rotating shaft, a motor, a limiting block, an electric telescopic rod, and a collection case;

the portion of the main base which is adjacent the one end of the pipe limiting-block is welded with the supporting seat; an internal bottom end of the supporting seat is connected with the moving block; an edge part of one end of the moving block is fixedly provided with the connection block; an inner side of the connection block is connected with the rotating shaft; one end of the rotating shaft is connected with the motor; an other end of the rotating shaft is connected with the limiting block; an edge part of a top end of the moving block is connected with the electric telescopic rod; a top end of the electric telescopic rod is connected with the collection case; and the motor and an input end of the electric telescopic rod are electrically connected with an output end of an external power supply.

9. The pneumatic stripping tool according to claim 8, wherein slide grooves are formed in portions, which are corresponding to the moving block, of an inner wall of the supporting seat; balls are uniformly embedded at portions, which are located inside the slide grooves, of edge parts of the moving block; an outer portion of the collection case is fitted to the inner wall of the supporting seat; and a bottom end of an inner portion of the collection case is flush with a middle part of the top end of the pipe limiting-block.

10. The pneumatic stripping tool according to claim 8, wherein an internal thread is formed on an inner portion of the connection block; an external thread is formed on an outer portion of the rotating shaft; the connection block is threadedly connected with the rotating shaft; and the motor is fixedly connected with the supporting seat.

\* \* \* \* \*